(12) United States Patent
Kozak

(10) Patent No.: US 8,403,591 B2
(45) Date of Patent: Mar. 26, 2013

(54) INTERCHANGEABLE-CORE ADJUSTER ASSEMBLY FOR OPTICAL MOUNTS

(76) Inventor: Eugeniusz Kozak, Mount Olive, NJ (US)

( * ) Notice: Subject to any disclaimer, the term of this patent is extended or adjusted under 35 U.S.C. 154(b) by 259 days.

(21) Appl. No.: 12/929,397

(22) Filed: Jan. 21, 2011

(65) Prior Publication Data

US 2011/0185831 A1    Aug. 4, 2011

Related U.S. Application Data

(60) Provisional application No. 61/282,402, filed on Feb. 3, 2010.

(51) Int. Cl.
*F16B 35/00* (2006.01)

(52) U.S. Cl. ........................................ 403/362; 411/393

(58) Field of Classification Search .................. 403/299, 403/362; 411/338, 339, 393, 173, 175, 174, 411/80.5, 80.6; 359/813, 819, 822, 811
See application file for complete search history.

(56) References Cited

U.S. PATENT DOCUMENTS

| | | | | |
|---|---|---|---|---|
| 2,213,919 A * | 9/1940 | Michon | ........................ | 411/80.6 |
| 6,016,230 A * | 1/2000 | Nunnally et al. | ............. | 359/819 |
| 6,174,118 B1 * | 1/2001 | Rebers et al. | .................. | 411/352 |
| 6,198,580 B1 * | 3/2001 | Dallakian | ........................ | 359/813 |
| 7,688,528 B2 * | 3/2010 | Michael et al. | ................ | 359/811 |
| 7,993,085 B2 * | 8/2011 | McClure | ........................ | 411/80.6 |
| 8,267,630 B2 * | 9/2012 | Moon et al. | .................... | 411/338 |
| 2006/0081745 A1 * | 4/2006 | Theriault et al. | .......... | 248/231.51 |

FOREIGN PATENT DOCUMENTS

JP    03-203707    *    9/1991    .................... 359/819

* cited by examiner

*Primary Examiner* — Michael P Ferguson
(74) *Attorney, Agent, or Firm* — Thomas J. Germinario

(57) ABSTRACT

The interchangeable-core adjuster assembly for optical mounts comprises a carrier bushing and an internally-threaded core bushing that fits snuggly inside the carrier bushing. The carrier bushing is fixedly fitted into the hole the stage plate of the optical mount, and the core bushing slides inside it. The core bushing is irrotatably locked into position within the carrier bushing by conjugate key-keyway structures on carrier and core bushings. While the carrier bushing remains in the stage plate of the optical mount, the core bushing can be removed and replaced with another core bushing having a different pitch. In this way, the same mount may be used with either fine adjuster screw or ultra-fine adjuster screws by simply interchanging core bushings having the corresponding pitches.

5 Claims, 7 Drawing Sheets

INTERCHANGEABLE-CORE ADJUSTER ASSEMBLY FOR OPTICAL MOUNTS

REFERENCE TO RELATED APPLICATION

This application claims the benefit of the filing date of Provisional Patent Application No. 61/282,402, filed on Feb. 3, 2010.

BACKGROUND OF THE INVENTION

The present invention relates to precision optical mounts used to make ultra-fine adjustments to the positions and/or angular orientations of optical components.

Adjustable mounting apparatuses are commonly used in applications, such as interferometry and holography, in which precise positioning of optical components is essential. Such optical mounts typically comprise a pair of parallel plates: a base plate, which is rigidly fixed to a supporting base or surface, and a stage plate, on which optical components, such as mirrors, lenses, diffraction gratings, prisms, beam-splitters, light sources, and lasers, are mounted. Typically, the stage plate is coupled to the base plate by one or more compressive means—usually springs—which urge the two plates together. Countering the tensioning force of the springs are multiple kinematic adjustment members, which are typically fine pitch adjuster screws that control the position of the stage plate relative to the base plate.

In the prior art, as shown in FIG. 1, the adjuster screw is threaded through the stage plate by means of a threaded bushing, wherein the pitch of bushing threads matches that of the adjuster screw. The threaded bushing is usually press fitted or adhesively bonded into a matching hole in the stage plate of the optical mount, such that the bushing cannot be removed once it is fitted into the mount. For fine resolution applications, the pitch of the adjuster screw and threaded bushing is typically 80 TPI. But in more demanding applications, in which ultra-fine resolution is needed, ultra-fine pitch of 0.10 mm may be required. While there is a need to to interchange adjuster screws of different pitches in an optical mount, however, the prior art threaded bushing does not allow this, but instead requires that the entire mount be changed, because the bushing has been irremovably fitted into the stage plate of the mount.

The present invention fulfills the need for adjuster pitch interchangeability by providing a multi-component adjuster assembly in place of the single-component bushing of the prior art. The adjuster assembly comprises a carrier bushing and an internally-threaded core bushing that fits snuggly inside the carrier bushing. The carrier bushing is fixedly fitted into the hole in the stage plate, and the core bushing slides inside it. The core bushing is irrotatably locked into position within the carrier bushing by conjugate key-keyway structures on the carrier and core bushings. Alternately, the core bushing can have exterior threading that threads into interior threading in the carrier bushing. While the carrier bushing remains in the stage plate of the optical mount, the core bushing can be removed and replaced with another core bushing having a different thread pitch. In this way, the same mount may be used with either fine adjuster screws (e.g., 80 TPI) or ultra-fine adjuster screws (e.g., 0.10 mm) by simply interchanging core bushings having the corresponding pitches.

SUMMARY OF THE INVENTION

The present invention is an interchangeable-core adjuster assembly for optical mounts. It allows the same optical mount to use adjuster screws having different pitches. It also enables replacement of a damaged or defective bushing without replacing the entire optical mount. The interchangeable-core adjuster assembly has two principal components: a carrier bushing and a core bushing. The interior of the carrier bushing is congruent with the exterior of the core bushing, such that core bushing is snuggly but slideably insertable into the carrier bushing. Conjugate threading on the exterior of the core bushing and interior of the carrier bushing is also an option. Where such threading is not used, rotation of the core bushing within the carrier bushing is prevented by interlocking key-keyway structures in the core and carrier bushings. For example, there can be a key-way depression within the receiving end of the carrier bushing which mates with a key projection on the outer surface of the distal end of the core bushing, as depicted in FIG. 2A. The adjuster screw threads into conjugate threading in the interior of the core bushing, as shown in FIG. 2B.

DETAILED DESCRIPTION OF THE PREFERRED EMBODIMENT

Figure 3:
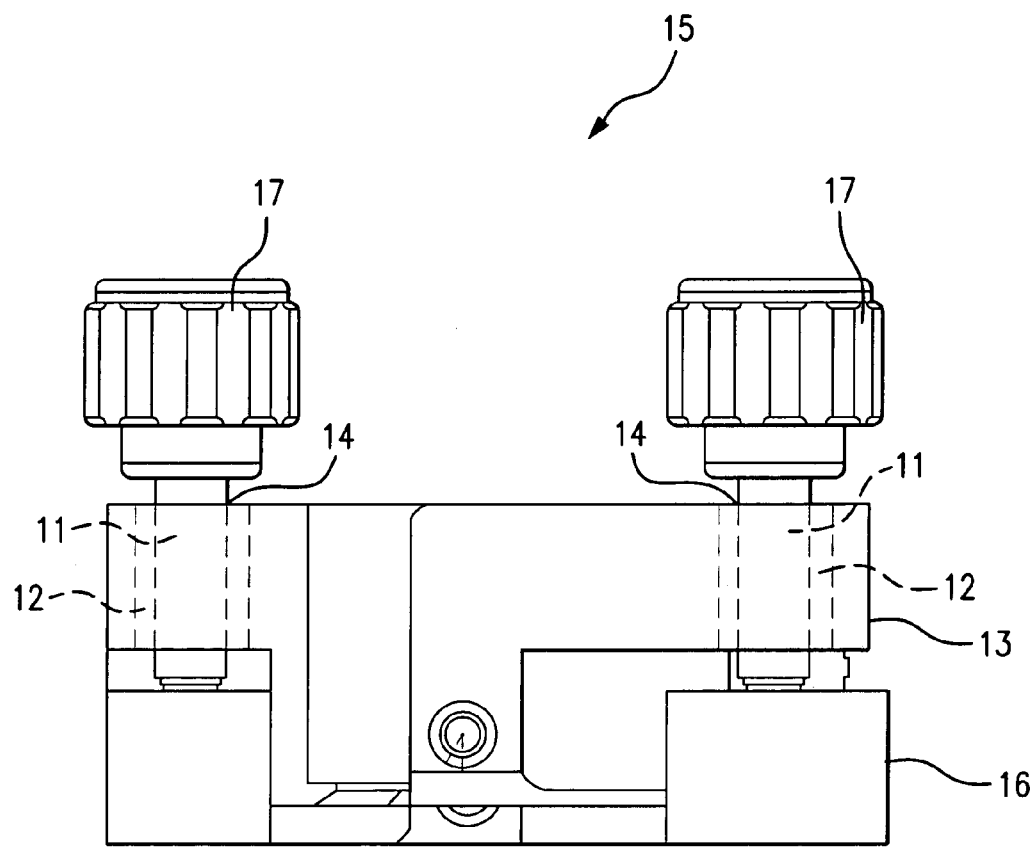
FIG. 3 is a side profile view of a typical optical mount to which the present invention can be applied.

FIG. 3 depicts a typical optical mount 15 to which the present invention can be applied. The optical mount 15 has a base plate 16, which is adjustably compressively coupled to a stage plate 13. The stage plate 13 is configured to hold one or more optical components, such as mirrors, lenses, diffraction gratings, prisms, beam-splitters, light sources, and lasers.

Adjuster screws 11 are used to adjust the position and angle of the stage plate 13 relative to the base plate 16. The finer the pitch of the adjuster screws 11, the finer the achievable resolution of the position of the stage plate 13, and hence of the optical components, relative to the base plate 16. The adjuster screws 11 thread into bushings 12 having an internal threading that matches of the pitch of the external threading on the adjuster screws 11. The bushings 12 occupy holes 14 bored through the stage plate 13. Knobs 17 on the proximal ends of the adjuster screws 11 facilitate the turning of the adjuster screws 11.

Figure 1:
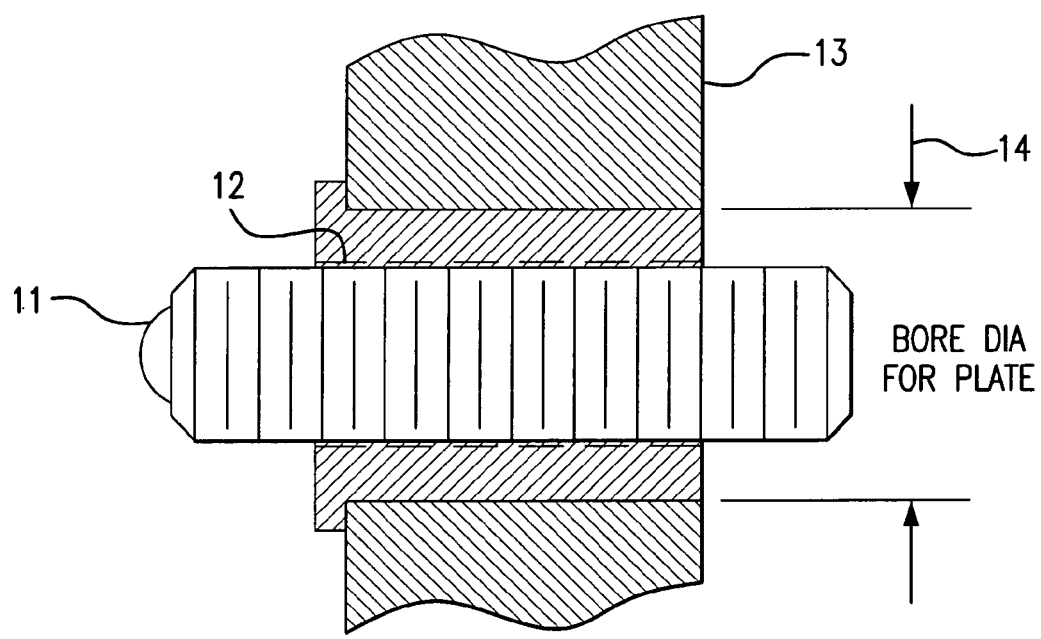
FIG. 1 is side cutaway view of the prior art adjuster screw and bushing for optical mounts.

In the prior art, as shown in FIG. 1, the adjuster screw 11 is threaded through the stage plate 13 by means of a standard single-component bushing 12 that is press fitted or adhesively bonded into a matching hole 14 in the stage plate 13, such that the standard bushing 12 cannot be removed once it is fitted into the stage plate 13.

Figure 2A:
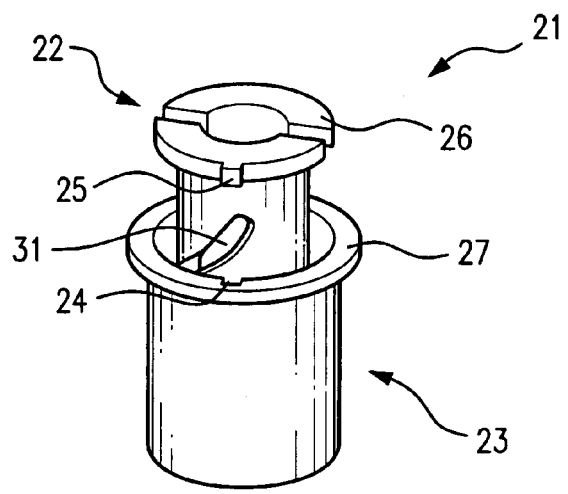
FIG. 2A is a perspective view of components and features of a composite bushing in accordance with the preferred embodiment of the present invention.
Figure 2B:
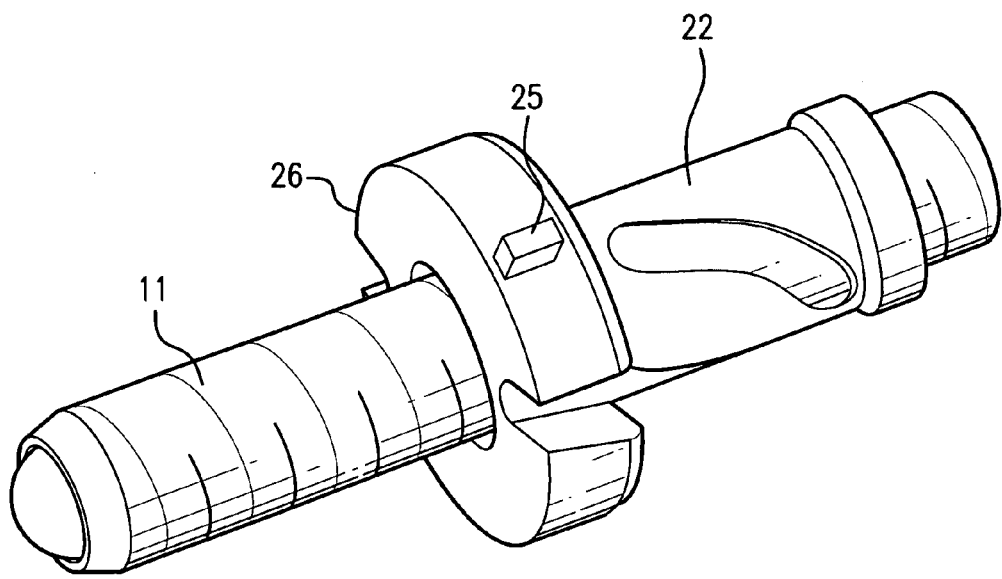
FIG. 2B is a perspective view of an adjuster screw threaded through a core bushing in accordance with the preferred embodiment of the present invention.

In the present invention, an example of which is shown in FIGS. 2A and 2B, the single-component bushing 12 of the prior art is replaced by a composite bushing 21, comprising a core bushing 22 and a carrier bushing 23. The core bushing 22 fits, slideably but snuggly, inside the carrier bushing 23, which is fixed within the hole 14 of the stage plate 13. The stepped cylindrical exterior of the core bushing 22 is congruent with the stepped interior bore of the carrier bushing 23, such that the core bushing 22 radially constricts as it is initially inserted into the carrier bushing 23, and then, as the insertion is completed, expands within the bore of the carrier bushing 23 to engage the interior surface of the carrier bushing 23. Optionally, the core bushing 22 can be slotted, as shown in FIGS. 2A and 2B, to facilitate its radial constriction as it is initially inserted into the carrier bushing 23. Once insertion of the core bushing 22 into the carrier bushing 23 is completed, alignment of cooperating key 25 and keyway 24 structures, which can be located on cooperating distal contours 28 and 32 of the core 22 and carrier 23 bushings, respectively, prevents rotation of the core bushing 22 within the carrier bushing 23.

Figure 4A:
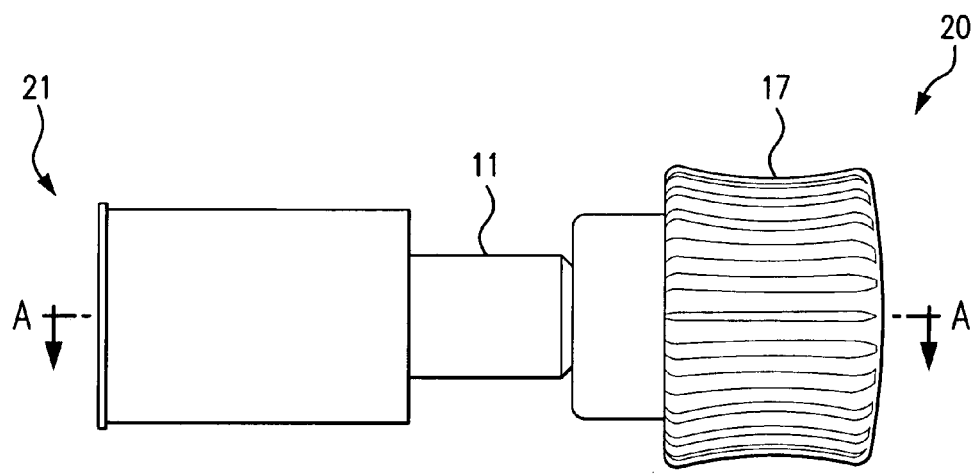
FIG. 4A is a side profile view of an adjuster assembly in accordance with the preferred embodiment of the present invention.
Figure 4B:
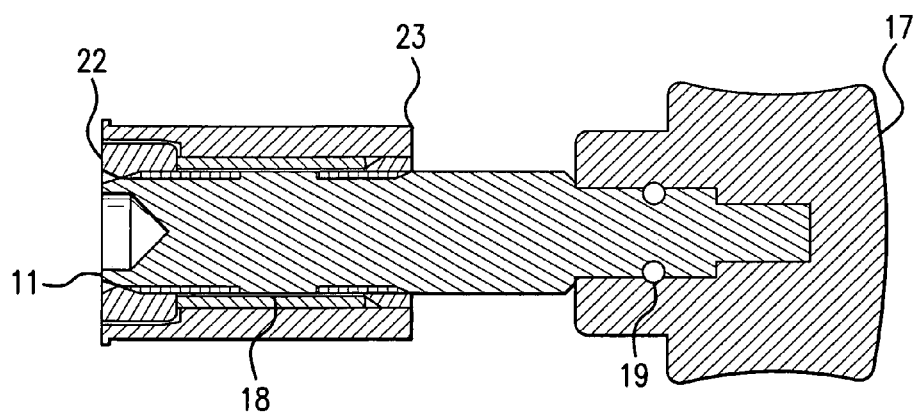
FIG. 4B is a cross-sectional view of the adjuster assembly of FIG. 4A taken along the line A-A.
Figure 5A:
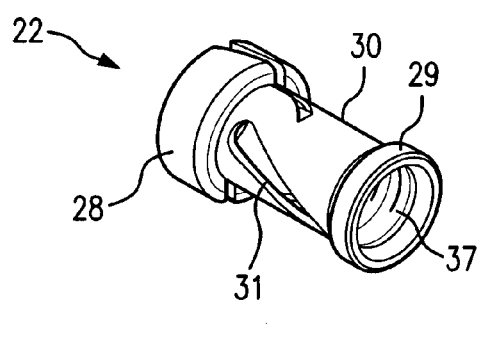
FIG. 5A is an isometric view of a core bushing in accordance with the preferred embodiment of the present invention.
Figure 5C:
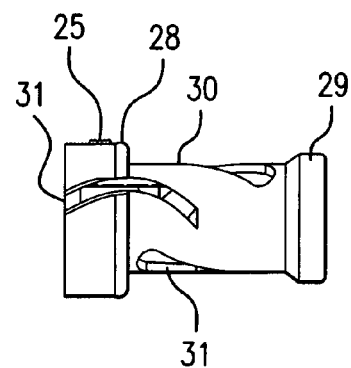
FIG. 5C is a longitudinal projection view of the core bushing of FIG. 5A.
Figure 5B:
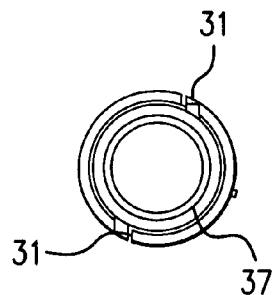
FIG. 5B is a transverse projection view looking into the distal end of the core bushing of FIG. 5A.
Figure 5D:
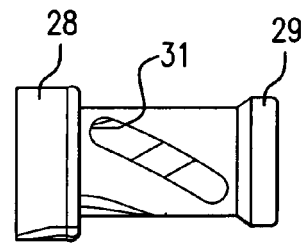
FIG. 5D is a longitudinal projection view of the core bushing of FIG. 5A.

The exemplary preferred embodiment of the interchangeable-core adjuster assembly 20 of the present invention is depicted in FIGS. 4A and 4B. The adjuster screw 11, which is attached to the knob 17 by means of a compressible O-ring 19, is shown fully threaded into the composite bushing 21. As shown in the cross-sectional view of FIG. 4B, the composite bushing in this embodiment consists of three components: the core bushing 22, the carrier bushing 23, and a bushing sleeve 18. The bushing sleeve 18 is a cylindrical sleeve used to cover the medial neck 30 of the slotted core bushing 22 in order to contain lubricant from the adjuster screw 11 which extrudes through the bushing slots 31 (see FIGS. 5A and 5D).

Figure 6A:
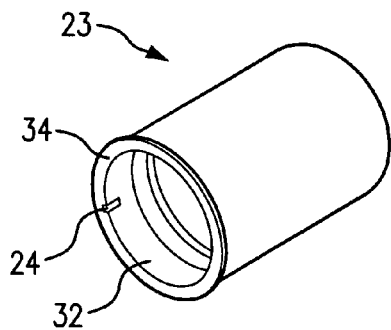
FIG. 6A is an isometric view of a carrier bushing in accordance with the preferred embodiment of the present invention.
Figure 6C:
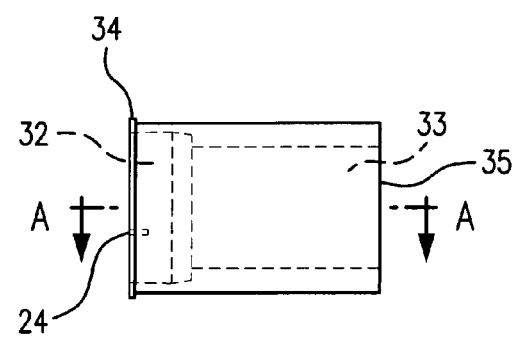
FIG. 6C is a longitudinal projection view of the core bushing of FIG. 6A.
Figure 6B:
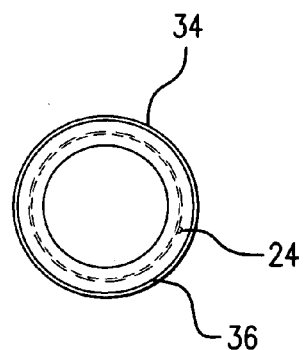
FIG. 6B is a transverse projection view looking into the distal end of the carrier bushing of FIG. 6A.
Figure 6D:
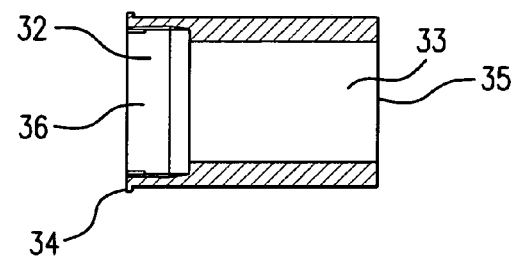
FIG. 6D is a cross sectional view of the core bushing of FIG. 6C taken along the line A-A.

The configuration of a slotted core bushing 22 of the preferred embodiment is depicted in FIGS. 5A, 5B, 5C, and 5D. The slotted core bushing 22 is configured with a proximal step 29, a medial neck 30, and a distal step 28. The distal step 28 has a slightly larger diameter than the proximal step 29, which in turn has a slightly larger diameter than the medial neck 30. Arcuate oblong slots 31 are cut through the medial neck 30 and the distal step 28 of the core bushing 22. The slots 31 enable the core bushing 22 to radially constrict for a tighter fit as it is inserted into the carrier bushing 23. The slots 31, in conjunction with the bushing sleeve 18, also achieve a more uniform and consistent distribution of lubrication on the adjuster screw 11. The proximal step 29 has a slightly larger diameter than that of the medial bore 33 of the carrier bushing 23, such that the proximal step 29 radially constricts as the core bushing 22 is being inserted into the carrier bushing 23, and then expands as it reaches the proximal aperture 35 of the carrier bushing (see FIG. 6D), thereby stabilizing the longitudinal position of the core bushing 22 within the carrier bushing 23.

The slotted core bushing 22 has internal threading 37, which matches the pitch of the adjuster screw 11. Since the core bushing 22 is removable from the carrier bushing 23, it can be interchanged with another core bushing 22 having a different threading pitch to accommodate an adjuster screw 11 having any desired pitch. The core bushing 22 also has a male key 25 on its distal step 28, which key 25 cooperates with a female keyway 24 within the distal bore 32 of the carrier bushing 23 (see FIGS. 6A and 6C), thereby preventing rotation of the core bushing 22 within the carrier bushing 23.

The configuration of the carrier bushing 23 of the preferred embodiment is depicted in FIGS. 6A, 6B, 6C, and 6D. The carrier bushing 23 has a distal flange 34 to retain the carrier bushing 23 securely within the hole 14 of the optical mount 15. The carrier bushing 23 has a distal aperture 36, into which the core bushing 22 is inserted, and a proximal aperture 35, from which the proximal end of the core bushing 22 emerges upon complete insertion. Within the carrier bushing 23 are a distal bore 32 and a medial bore 33, with the former having a slightly larger diameter than latter, in order to be congruent with the distal step 28 and medial neck 30 of the core bushing 22. The carrier bushing 23 also has a female keyway 24, which cooperates with the male key 25 of the core bushing 22.

Figure 7:
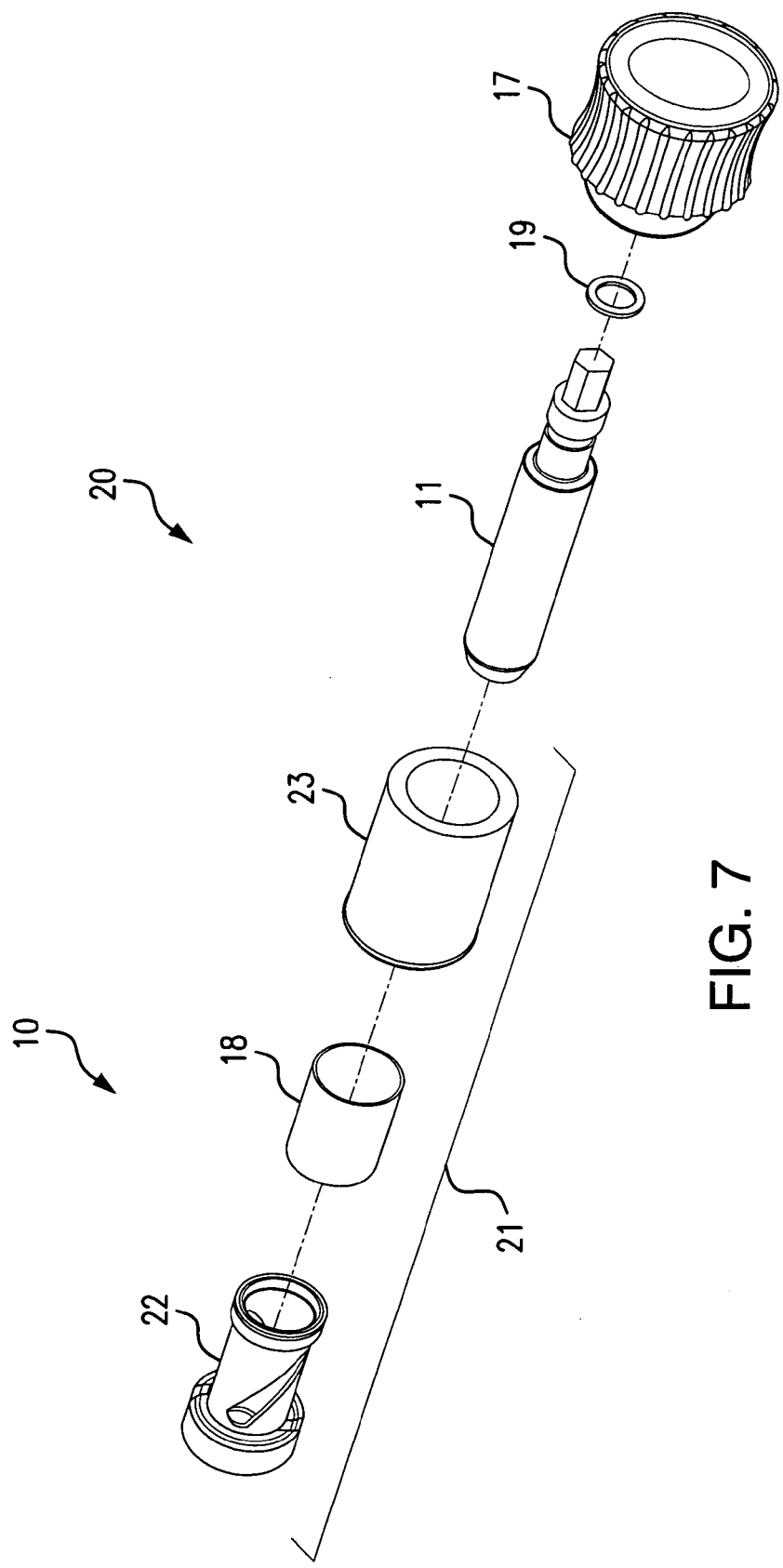
FIG. 7 is an exploded view of the adjuster assembly in accordance with the preferred embodiment of the present invention.

The adjuster assembly 20 in accordance with the exemplary preferred embodiment of the present invention 10 is shown in exploded view in FIG. 7. The core bushing 22 slides inside the bushing sleeve 18, which slides over the medial neck 30 of the core bushing 22. Thus covered, the core bushing 22 then slides inside the carrier bushing 23 to form the composite bushing 21. The adjuster screw 11 can then be inserted into the proximal end of the composite bushing 21 and then threaded into the internal threading 37 of the core bushing 22 by turning the knob 17, which is connected to the proximal end of the adjuster screw 11 by means of the O-ring 19.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. For an optical mount having a stage plate compressively coupled to a base plate, an interchangeable-core adjuster assembly comprising:
   a carrier bushing which is configured to be fixedly insertable into a hole in the stage plate of the optical mount;
   a core bushing which is removably and compressibly insertable into the carrier bushing and which has internal threading of a particular pitch;
   an adjuster screw which screws into the core bushing and which has threading that matches the pitch of the core bushing threading;
   wherein the core bushing comprises an annular wall defining outer contours and inner contours, and the carrier busing comprises an annular wall defining outer contours and inner contours;
   wherein the outer contours of the core bushing are congruent with the inner contours of the carrier bushing;
   wherein the carrier bushing has a first axial bore defined by the inner contours of the carrier bushing, which first axial bore is concentric with the outer contours of the carrier bushing, and the core bushing has a second axial bore defined by the inner contours of the core bushing, which second axial bore is concentric with the outer contours of the core bushing, and the second axial bore is concentric with the first axial bore;

wherein the core bushing has one or more bushing slots, which enable radial constriction and expansion of the core bushing in response to radial forces on the core bushing as the core bushing is inserted into the carrier bushing, and which enable the core bushing to be compressibly insertable into the carrier bushing;

wherein the core bushing is interchangeable with one or more alternate core bushings, each having a different threading pitch;

wherein the adjuster screw is interchangeable with one or more alternate adjuster screws, each having a different pitch corresponding to the threading pitch of one of the alternate core bushings; and wherein the outer contours of the core bushing define a medial neck, and wherein the core bushing further comprises a tubular bushing sleeve which fits snuggly over the medial neck, and wherein the bushing sleeve covers the bushing slots of the core bushing so as to contain lubricant that extrudes from the adjuster screw through the bushing slots.

2. The interchangeable-core adjuster assembly according to claim 1, wherein the outer contours of the core bushing define a stepped cylindrical exterior and the first axial bore of the carrier bushing comprises a congruent stepped interior bore.

3. The interchangeable-core adjuster assembly according to claim 2 wherein the core bushing initially radially constricts as it is inserted into the carrier bushing, and then, as insertion is completed, the core bushing expands so that the stepped cylindrical exterior of the core bushing snuggly engages the stepped interior bore of the carrier bushing.

4. The interchangeable-core adjuster assembly according to claim 3, wherein the bushing slots are arcuate oblong slots that are cut through the core bushing.

5. The interchangeable-core adjuster assembly according to any one of claims 1 through 4, wherein an interior distal end of the carrier bushing has a female keyway which mates with a male key in an exterior distal end of the core bushing, thereby preventing rotation of the core bushing within the carrier bushing.

* * * * *